(12) United States Patent
Scholtes

(10) Patent No.: US 10,253,689 B2
(45) Date of Patent: Apr. 9, 2019

(54) ENGINE TRIGGER WHEEL

(71) Applicant: Ford Global Technologies, LLC, Dearborn, MI (US)

(72) Inventor: Duncan Scholtes, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 15/200,990

(22) Filed: Jul. 1, 2016

(65) Prior Publication Data

US 2017/0016394 A1    Jan. 19, 2017

(30) Foreign Application Priority Data

Jul. 15, 2015 (GB) .................................. 1512333.4

(51) Int. Cl.
| | | |
|---|---|---|
| *F16F 15/22* | (2006.01) | |
| *F02B 77/08* | (2006.01) | |
| *F16C 3/06* | (2006.01) | |
| *G01M 15/06* | (2006.01) | |
| *G01M 1/24* | (2006.01) | |
| *G01M 1/36* | (2006.01) | |

(Continued)

(52) U.S. Cl.
CPC .......... *F02B 77/085* (2013.01); *F02D 41/009* (2013.01); *F02P 7/0675* (2013.01); *F16C 3/06* (2013.01); *G01M 1/24* (2013.01); *G01M 1/36* (2013.01); *G01M 15/06* (2013.01); *F01L 2820/042* (2013.01)

(58) Field of Classification Search
CPC ... F02B 77/085; F02D 41/009; G01D 5/2457; G01D 5/3473; G01M 15/06

USPC ............ 123/198 D, 192.1, 192.2; 29/893.33; 74/446–448, 434, 443
See application file for complete search history.

(56) References Cited

U.S. PATENT DOCUMENTS

| | | | | |
|---|---|---|---|---|
| 3,109,417 A | * | 11/1963 | Bekkala | ..................... F02D 1/00 123/192.2 |
| 4,143,633 A | * | 3/1979 | Peck | ..................... F02P 7/0675 123/146.5 A |

(Continued)

FOREIGN PATENT DOCUMENTS

| | | |
|---|---|---|
| JP | 2003056378 A | 2/2003 |
| KR | 101438315 B1 | 6/1998 |

(Continued)

OTHER PUBLICATIONS

Examination Report of Great Britain Patent Application No. 1512333. 4, dated Jan. 14, 2016, 8 pages, United Kingdom Intellectual Property Office.

*Primary Examiner* — Marguerite McMahon
*Assistant Examiner* — Tea Holbrook
(74) *Attorney, Agent, or Firm* — Julia Voutyras; McCoy Russell LLP

(57) ABSTRACT

An engine trigger wheel is disclosed having a central annular portion and a cylindrical rim portion defining a number of trigger teeth, wherein the central annular and cylindrical rim portions are pressed from a single piece of metal. A number of balance apertures are formed in the central annular portion to move a center of mass of the trigger wheel away from an axis of rotation. The engine trigger wheel when fastened to one end of a crankshaft of an engine provides both an indication of the angular position of the crankshaft and a counterweight function.

16 Claims, 8 Drawing Sheets

(51) Int. Cl.
*F02D 41/00* (2006.01)
*F02P 7/067* (2006.01)

(56) References Cited

U.S. PATENT DOCUMENTS

| | | | | |
|---|---|---|---|---|
| 5,259,269 A * | 11/1993 | Swenson, Sr. | ........ | F16F 15/283 74/571.11 |
| 6,073,713 A * | 6/2000 | Brandenburg | .......... | F02N 11/04 180/65.22 |
| 6,090,320 A * | 7/2000 | Grundner | ................ | B22F 5/08 156/308.2 |
| 6,277,045 B1 * | 8/2001 | Waters Scheuer | ........ | F01L 1/02 474/152 |
| 6,386,166 B1 * | 5/2002 | Scott | ......................... | F01L 1/34 123/90.17 |
| 6,490,914 B1 * | 12/2002 | Brandenburg | ........ | F02N 15/006 73/114.26 |
| 6,732,691 B1 | 5/2004 | Lee et al. | | |
| 6,817,959 B1 * | 11/2004 | Blaimschein | ........... | F16H 55/17 474/152 |
| 6,959,683 B2 * | 11/2005 | Gokan | .................... | F16F 15/26 123/192.1 |
| 7,004,046 B2 * | 2/2006 | Noguchi | ................. | F16H 55/17 74/443 |
| 7,013,854 B1 * | 3/2006 | Heintzen | ............... | F01L 1/3442 123/90.15 |
| 7,454,961 B2 * | 11/2008 | Pirone | .................... | G01D 5/147 73/114.26 |
| D651,950 S * | 1/2012 | Song | ........................... | D12/180 |
| 8,864,612 B2 * | 10/2014 | Kida | ...................... | B21D 53/28 474/152 |
| 9,046,447 B2 * | 6/2015 | Ahn | ........................ | G01D 5/145 |
| 2001/0023676 A1 * | 9/2001 | Takano | ................... | F02B 75/20 123/192.2 |
| 2002/0017153 A1 * | 2/2002 | Sakamaki | ............... | F16H 55/17 74/434 |
| 2005/0057244 A1 * | 3/2005 | McCarrick | .............. | G01P 3/488 324/174 |
| 2006/0185427 A1 * | 8/2006 | Ono | ....................... | F02N 15/006 73/114.62 |
| 2007/0089699 A1 * | 4/2007 | Satoh | ........................ | F16D 3/12 123/192.2 |
| 2007/0163336 A1 * | 7/2007 | Pirone | .................... | G01D 5/147 73/114.26 |
| 2008/0127916 A1 * | 6/2008 | Burgess | ................. | F01L 1/024 123/54.4 |
| 2009/0183701 A1 * | 7/2009 | Nguyen | .................. | F01L 1/344 123/90.15 |
| 2010/0043750 A1 * | 2/2010 | Lysinger | ............... | F02D 41/009 123/406.58 |
| 2010/0162977 A1 * | 7/2010 | Strandburg, III | ........ | F01L 1/047 123/90.6 |
| 2012/0220401 A1 * | 8/2012 | Kida | ...................... | B21D 53/28 474/152 |
| 2012/0325178 A1 * | 12/2012 | Walters | .................. | F02B 77/08 123/197.4 |
| 2016/0178480 A1 * | 6/2016 | Turner | .................. | F02B 77/085 73/114.26 |

FOREIGN PATENT DOCUMENTS

KR 200147448 Y1 6/1999
KR 20030001000 A 1/2003

* cited by examiner

ENGINE TRIGGER WHEEL

CROSS REFERENCE TO RELATED APPLICATION

This application claims priority to Great Britain Patent Application No. 1512333.4, filed Jul. 15, 2015, the entire contents of which are hereby incorporated by reference for all purposes.

FIELD

This invention relates to a reciprocating piston engine having a crankshaft and in particular to a trigger wheel for such an engine to provide an indication of the rotational position of the crankshaft of the engine.

BACKGROUND/SUMMARY

It is well known to attach a disc shaped trigger wheel having a number of peripheral teeth to a crankshaft of an engine. Such a trigger wheel needs to be sufficiently wide to produce a reliable signal.

Conventional practice is to mount a sensor in close proximity to the trigger wheel to sense the passing of each tooth for use by an associated engine management system in order to provide an indication of the rotational position of the crankshaft.

Normally such a trigger wheel is attached to the crankshaft at a position outside of a cylinder block of the engine. Such an arrangement has the disadvantage that the overall package length of the engine is increased which is problematic in many current vehicles.

There is an increasing requirement to produce smaller engines particularly for city cars and hybrid vehicles where the available space to package the engine is limited.

In addition, a front mounted engine represents a hard point so far as a frontal collision is concerned and so it is desirable to keep the engine as small as possible. Therefore any arrangement that can minimize the size and particularly the length of an engine is beneficial.

It is an object of the invention to provide an improved trigger wheel for an engine.

According to a first aspect of the invention there is provided an engine trigger wheel stamped from a single piece of steel comprising a central annular portion and a cylindrical rim portion arranged around an outer periphery of the central annular portion, the cylindrical rim portion having a plurality of circumferentially spaced apart trigger teeth and the central annular portion has at least one aperture formed therein to move a center of mass of the trigger wheel away from an axis of rotation of the trigger wheel wherein there are a number of circumferentially spaced apertures in the cylindrical rim portion and each of the trigger teeth is formed by a land between two adjacent apertures.

Each trigger tooth may extend substantially parallel to an axis about which the trigger wheel rotates in use.

The central annular portion may define a number of circumferentially spaced fixing holes used to fasten the trigger wheel to a crankshaft of an engine.

According to a second aspect of the invention there is provided an engine having a crankshaft located within a cylinder block of the engine, the crankshaft having a number of counterweights to provide dynamic balancing of the crankshaft in use including an end counterweight located in close proximity to one end wall of the cylinder block, the end counterweight having a recess formed therein in which is mounted an engine trigger wheel constructed in accordance with said first aspect of the invention, wherein the trigger wheel is angularly positioned and has an out of balance mass sufficient to compensate for the out of balance effect of the material lost from the end counterweight due to the recess and the cylindrical rim portion of the trigger wheel extends away from said one end wall of the cylinder block.

The trigger wheel may have a number of circumferentially spaced balance apertures and the sizing, spacing and positioning of the balance apertures in the trigger wheel may be arranged to compensate for the material lost from the end counterweight due to the recess.

The depth of the recess in the end counterweight may be substantially equal to the thickness of the central annular portion of the trigger wheel.

BRIEF DESCRIPTION OF THE FIGURES

The figures are drawn to scale, although other relative dimensions may be used, if desired.

DETAILED DESCRIPTION

Figure 1:
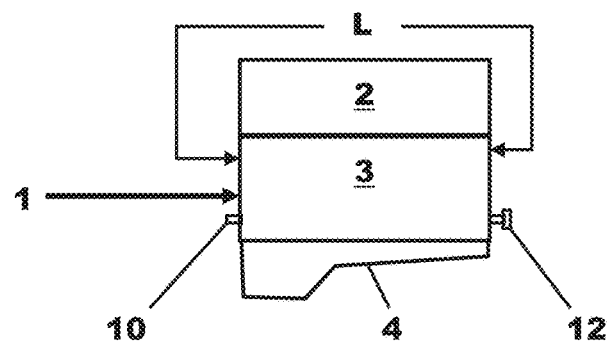
FIG. 1 is a schematic side view of a three cylinder engine constructed in accordance with the invention.
Figure 3A:
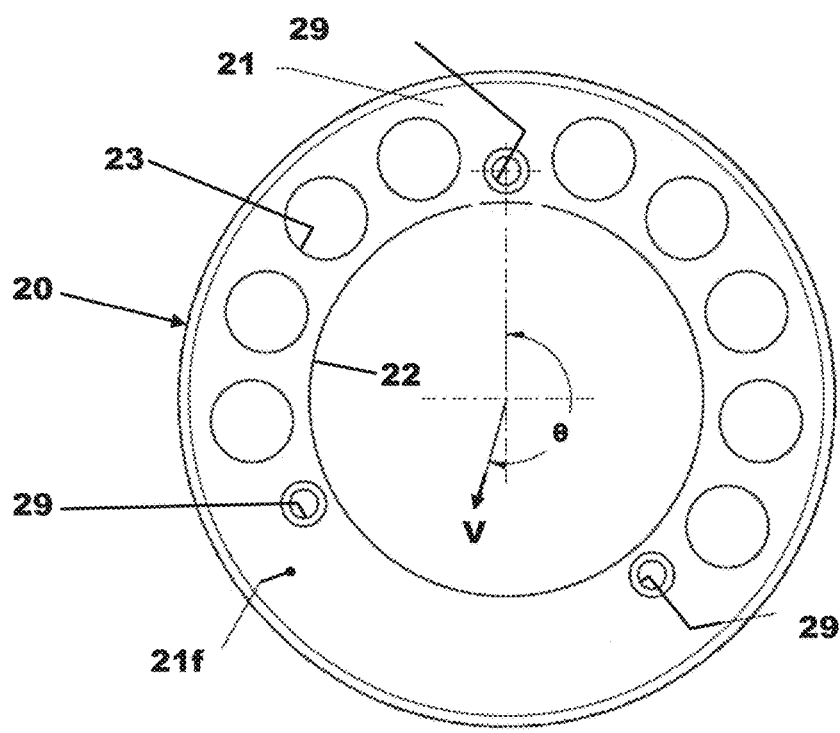
FIG. 3*a* is an end view a trigger wheel in accordance with a first aspect of the invention.

With reference to FIG. 1 there is shown a three cylinder engine 1 having a cylinder head 2, a cylinder block 3 and an oil pan 4. The cylinder block 3 rotationally supports a crankshaft 10 that has a flywheel flange 12 at one end used to attach a flywheel (not shown on FIG. 1) to the crankshaft 10. The overall length 'L' of the cylinder block 3 is kept as short as possible in order to improve packaging of the engine 1 in a motor vehicle.

Figure 2A:
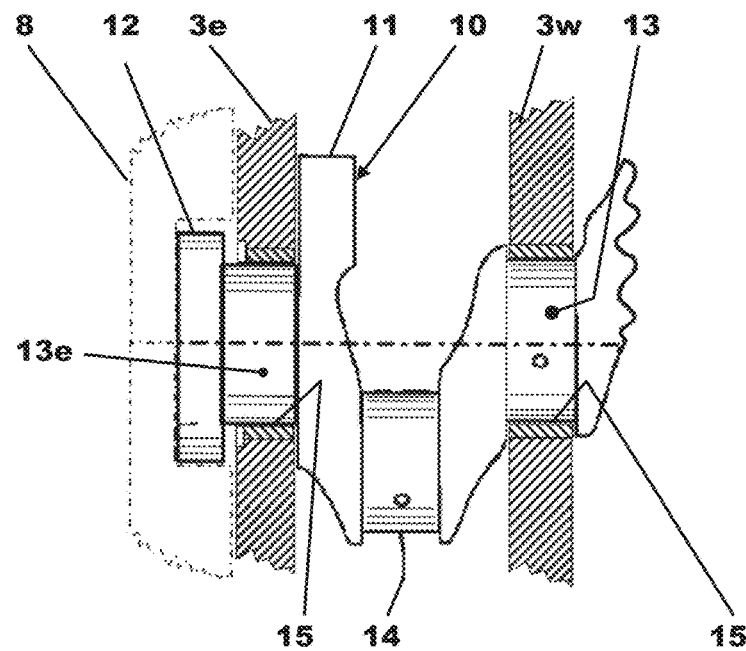
FIG. 2*a* is a scrap cross-section through an end portion of an engine showing the arrangement of crankshaft counterweight with respect to an end wall of a cylinder block of the engine.

With reference to FIG. 2*a* there is shown on a larger scale an end portion of the cylinder block 3 in the region of the flywheel flange 12 showing in dotted outline a flywheel 8 mounted on the flywheel flange 12.

The cylinder block 3 has a number of internal walls 3*w* and is bounded at each end by an end wall 3*e*. The walls 3*w*, 3e of the cylinder block 3 are arranged to support a number of bearings 15 that are used to support, via main bearing journals 13, 13e, the crankshaft 10 of the engine 1 for rotation about a longitudinal axis of the crankshaft 10.

The crankshaft 10 also has three big end bearing journals 14 of which only one is shown in FIG. 2a.

As is well known in the art the crankshaft 10 includes a number of counterweights of which only an end counterweight 11 is shown in FIG. 2a.

It will be appreciated that the end wall 3e is positioned as close as possible to the counterweight 11 in order to keep the overall length 'L' of the cylinder block 3 to a minimum. With such an arrangement it is usual to mount a trigger wheel on a part of the crankshaft 10 not located within the cylinder block 3 which has the effect of increasing the length of the engine 1 because the trigger wheel and its associated sensor are then located outside of the cylinder block 3.

Figure 2B:
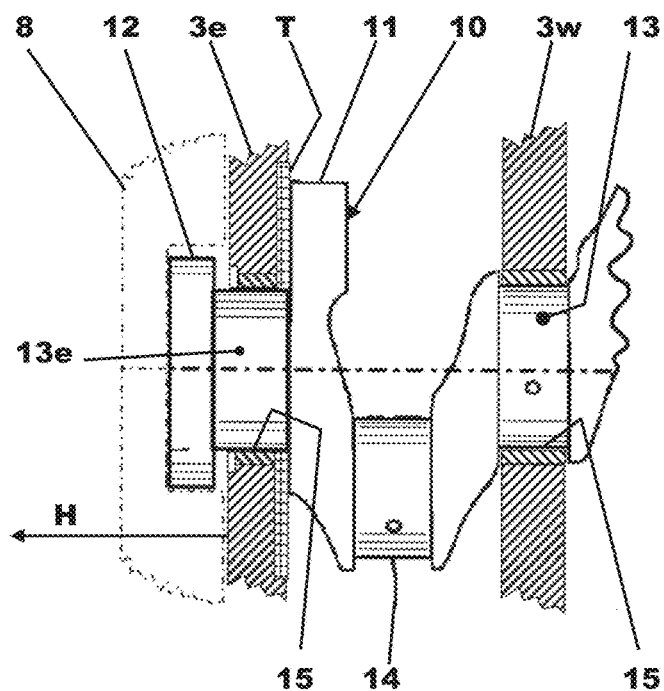
FIG. 2*b* is a scrap view of the part of the engine shown in FIG. 2*a* showing how the mounting of a conventional disc shaped trigger wheel to the counterweight produces a conflict condition with the end wall of the cylinder block.
Figure 8:
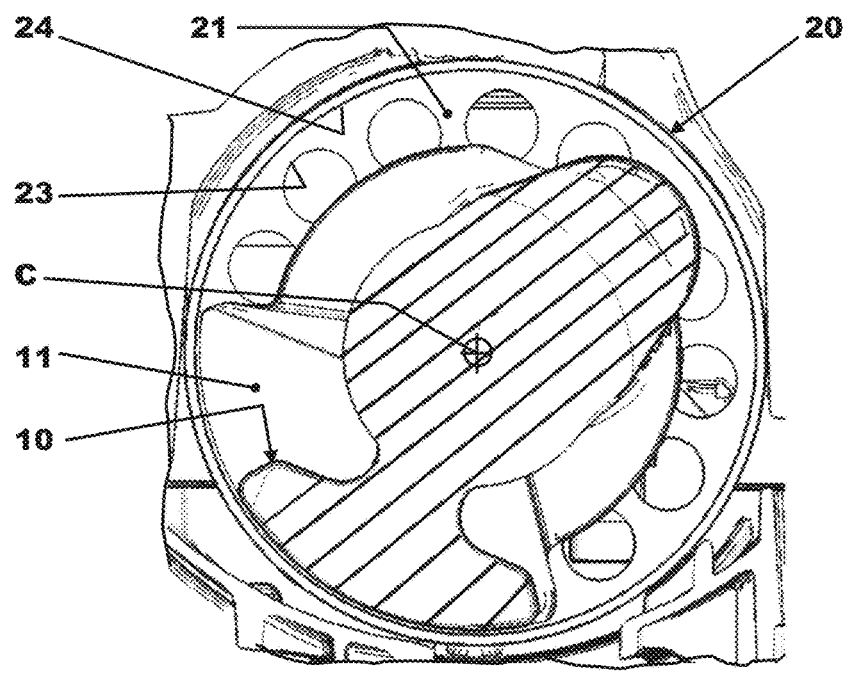
FIG. 8 is a partial cross-sectional view in the direction of the arrow 'R' on FIG. 6 showing the trigger wheel on the crankshaft.
Figure 3B:
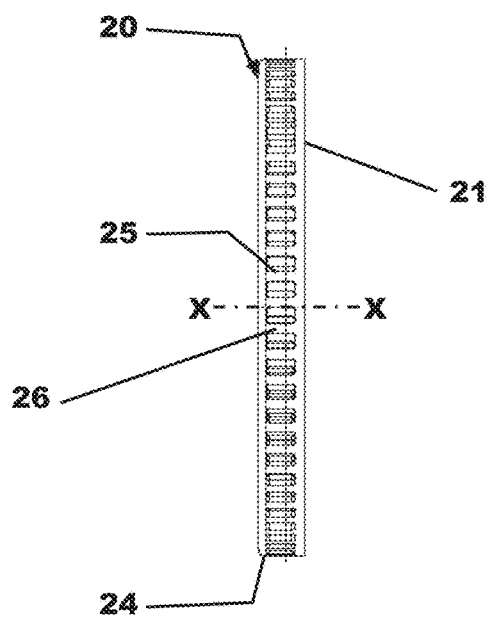
FIG. 3*b* is a side view the trigger wheel shown in FIG. 3*a*.
Figure 4:
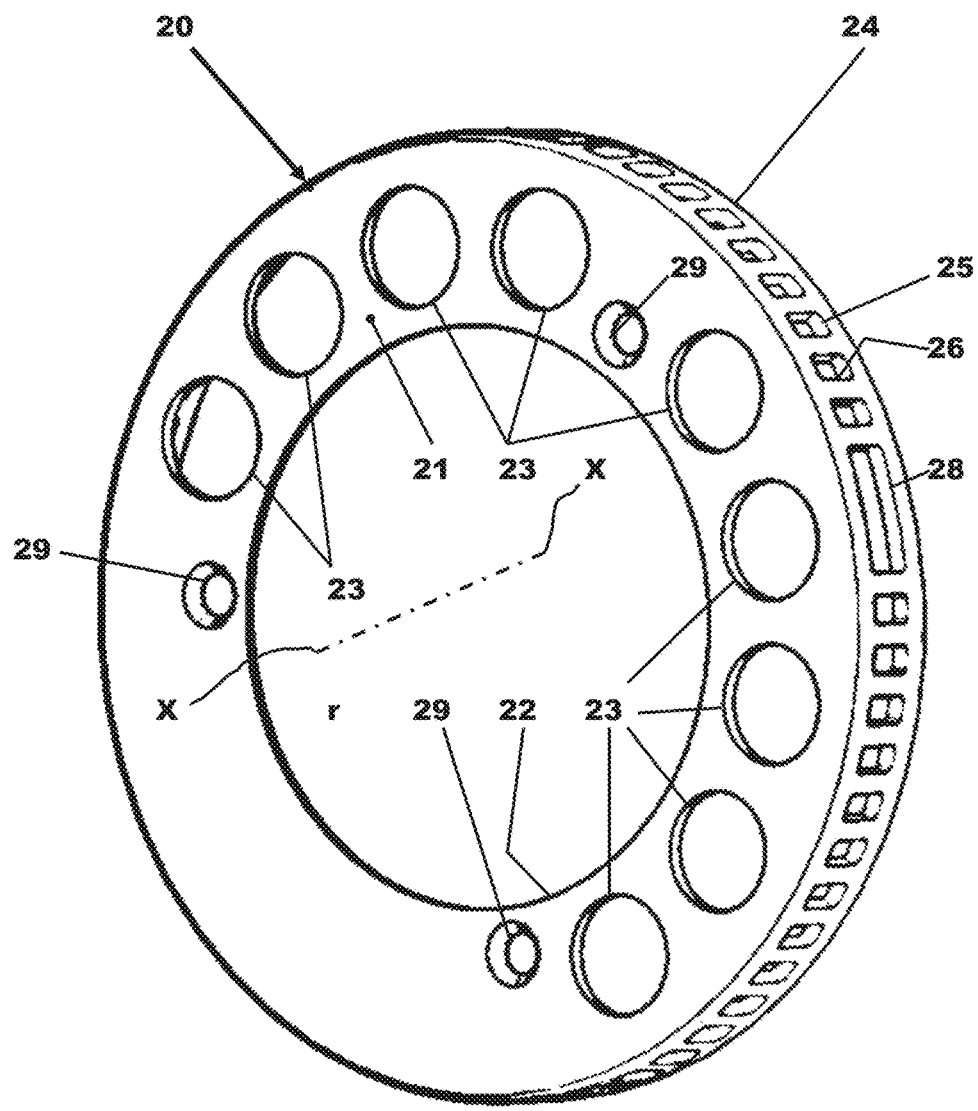
FIG. 4 is a pictorial representation of the trigger wheel shown in FIGS. 3*a* and 3*b*.

FIG. 2b is an identical view to that of FIG. 2a with the exception that it shows the mounting of a conventional disc shaped trigger wheel 'T' on an outer side of the counterweight 11. As can clearly be seen on FIG. 2b this will result in a conflict condition with respect to the end wall 3e of the cylinder block 3 that can only be overcome if the end wall 3e is moved away in the direction of the arrow 'H' on FIG. 2b. The moving of the end wall 3e in this manner will result in an increase in the overall length of the cylinder block 3.

Referring now with reference to FIGS. 3 to 9 there is shown an engine trigger wheel 20 having a central disc portion 21 and a peripheral cylindrical rim portion 24.

The disc portion 21 has in the case of this example nine balance apertures 23 stamped therein to move a center of mass of the trigger wheel 20 away from an axis of rotation of the trigger wheel 20. A number of fixing holes 29 are also provided in the disc portion 21 for use in securing the trigger wheel 20 to the crankshaft 10. Each of the fixing holes 29 has a chamfered lead-in.

The disc portion 21 has a central aperture 22 that is of a sufficiently large diameter to allow the trigger wheel 20 to be assembled past the flywheel flange 12. The central portion 21 is therefore annular having an inner edge defined by the central aperture 22 and an outer peripheral edge aligned with an outer surface of the cylindrical rim portion 24.

The cylindrical rim portion 24 has a number of spaced stamped apertures 25. Trigger teeth 26 are formed by lands between adjacent apertures 25. In the case of this example there are sixty trigger teeth 26 and two missing teeth formed by the use of a reference aperture 28 that is circumferentially much longer than any of the other apertures 25.

Figure 6:
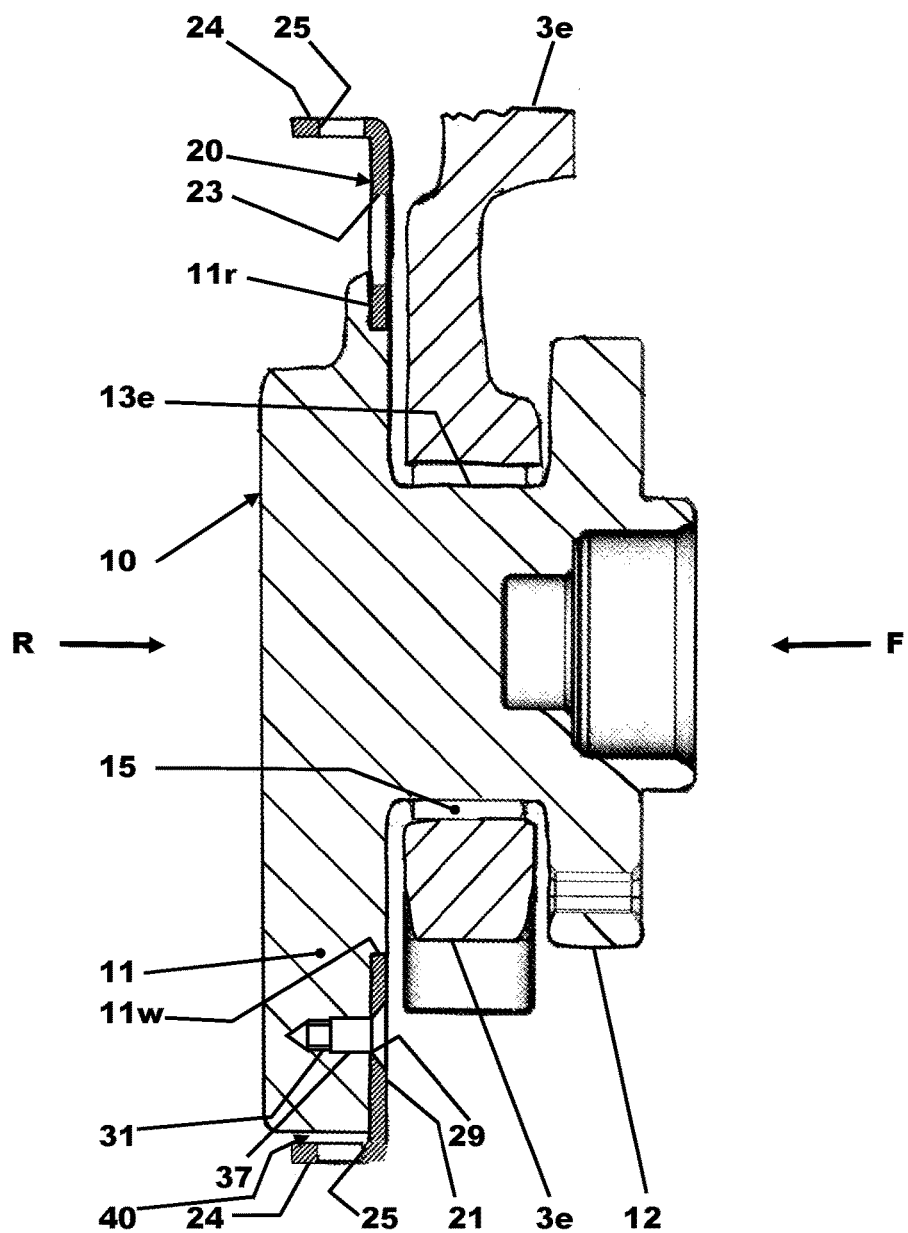
FIG. 6 is a scrap section through said one end of the crankshaft and an end wall of the engine showing the positioning of the trigger wheel on the crankshaft.
Figure 7:
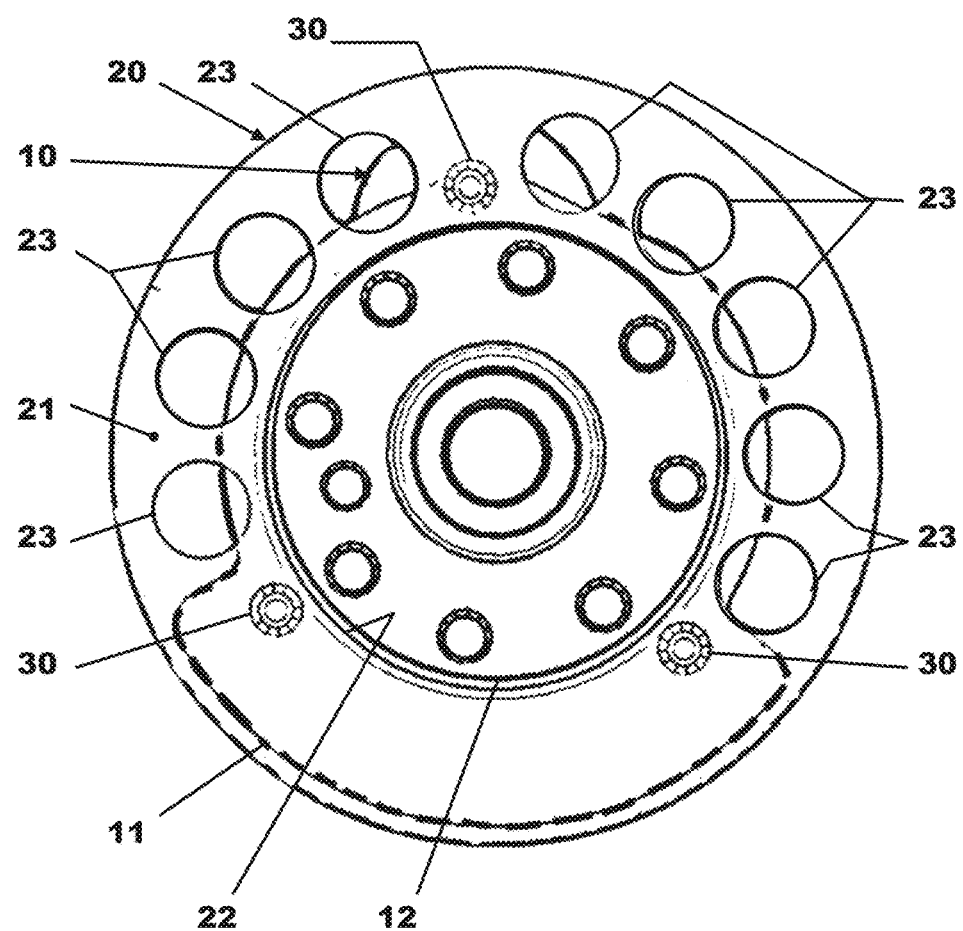
FIG. 7 is a view in the direction of arrow 'F' on FIG. 6 showing the trigger wheel in position on the crankshaft.

The cylindrical rim portion 24 has an inner radius that is sufficiently large to allow the cylindrical rim portion 24 to fit over the counterweight 11 when the trigger wheel 20 is fitted to the crankshaft 10. For example, as shown in FIG. 6, the cylindrical rim portion 24 is spaced away from the outer periphery of the (end) counterweight 11, in a direction perpendicular to the axis of rotation of the trigger wheel 20, by a gap 40, the gap 40 maintained around the circumference of the trigger wheel 20.

The trigger wheel 20 is formed from a single piece of steel that is deformed to produce the disc and rim portions 21 and 24. In this case, the trigger wheel 20 is formed by a stamping process and is therefore a stamped steel trigger wheel.

One advantage of the trigger wheel 20 is that the length of each trigger tooth 26 is not restricted to the thickness of the material used to make the trigger wheel 20. Each trigger tooth 26 is much longer than the thickness of the disc portion 21 because it is formed in the turned over cylindrical rim portion 24 of the trigger wheel 20. Therefore the trigger wheel 20 can be made from relatively thin material such as, for example, 0.0025 m thick steel that can be easily formed into the desired shape and the length of each trigger tooth 26 can be 0.01 m.

Therefore, because the thickness of the trigger wheel 20 does not affect its performance in terms of reliable signal production, it can be made relatively thin.

A further advantage of the use of a cylindrical turned over rim portion 24 is that it produces a cage like structure thereby protecting the trigger teeth 26 from damage. Also, because the trigger teeth 26 are formed as part of the cylindrical rim portion 24, the trigger teeth 26 are more resistant to bending than individual teeth of the same dimension would be.

Due to the displacement of the center of mass of the trigger wheel 20 compared to its axis of rotation, rotation of the trigger wheel 20 will produce an out of balance force in a radially outward direction on a vector 'V' (See FIG. 3a) passing through both the center of mass and the axis of rotation. In the case of this example the vector 'V' is located at an angle $\theta$ measured from a top one of the fixing holes 29 of 3.414 Radians (195.6 degrees).

The magnitude and direction of this out of balance force will depend upon the thickness of the material used to manufacture the trigger wheel 20, the positioning, size and number of apertures 23 and the rotational speed of the trigger wheel 20.

In order to allow the fitment of the trigger wheel 20 within the confines of the cylinder block 3 the counterweight 11 is provided with a recess 11r (FIG. 6) into which the trigger wheel 20 fits. The central aperture 22 of the annular disc portion 21 of the trigger wheel 20 is sized to provide a light push fit on a circumferentially extending inner wall 11w of the recess 11r thereby providing radial location of the trigger wheel 20 on the crankshaft 10. The depth of the recess 11r is substantially equal to the thickness of the material in the disc portion 21 of the trigger wheel 20. The loss of material from the counterweight 11 due to the recess 11r and its balancing effect are compensated for by the out of balance effect of the trigger wheel 20 so that when the trigger wheel is mounted on the crankshaft 10 the same balancing effect is provided as would be the case if there were no recess and no trigger wheel 20.

The trigger wheel 20 is fastened to the crankshaft 10 using in the case of this example three threaded fasteners 30. Each of the threaded fasteners 30 has a cylindrical shank portion for cooperation with a location counterbore 37 in the crankshaft 10 and a threaded end portion. Each threaded fastener 30 extends through a respective one of the three fixing holes 29 in the disc portion 21 of the trigger wheel 20 for engagement with a threaded bore 31 in the crankshaft 10. The trigger wheel 20 is fastened to the crankshaft 10 so that the cylindrical rim portion 24 extends away from the adjacent end wall 3e of the cylinder block 3 and overlies the counterweight 11.

Therefore, the size and positioning of the balance apertures 23 in the disc portion 21 are arranged to compensate for the loss of balance weight from the counterweight 11. It will be appreciated that the balance apertures 23 are angularly arranged such that the offset center of mass of the trigger wheel 20 is positioned so as to replace the loss of material from the counterweight 11 due to the recess 11r. Therefore during rotation of the crankshaft 10 the balancing effect of the counterweight 11 and trigger wheel 20 is substantially identical to that provided by the counterweight 11 without the recess 11r.

The use of such a trigger wheel 20 therefore enables the fitment of the trigger wheel 20 within the confines of the cylinder block 3 without needing to increase the length L of the cylinder block 3.

Figure 5:
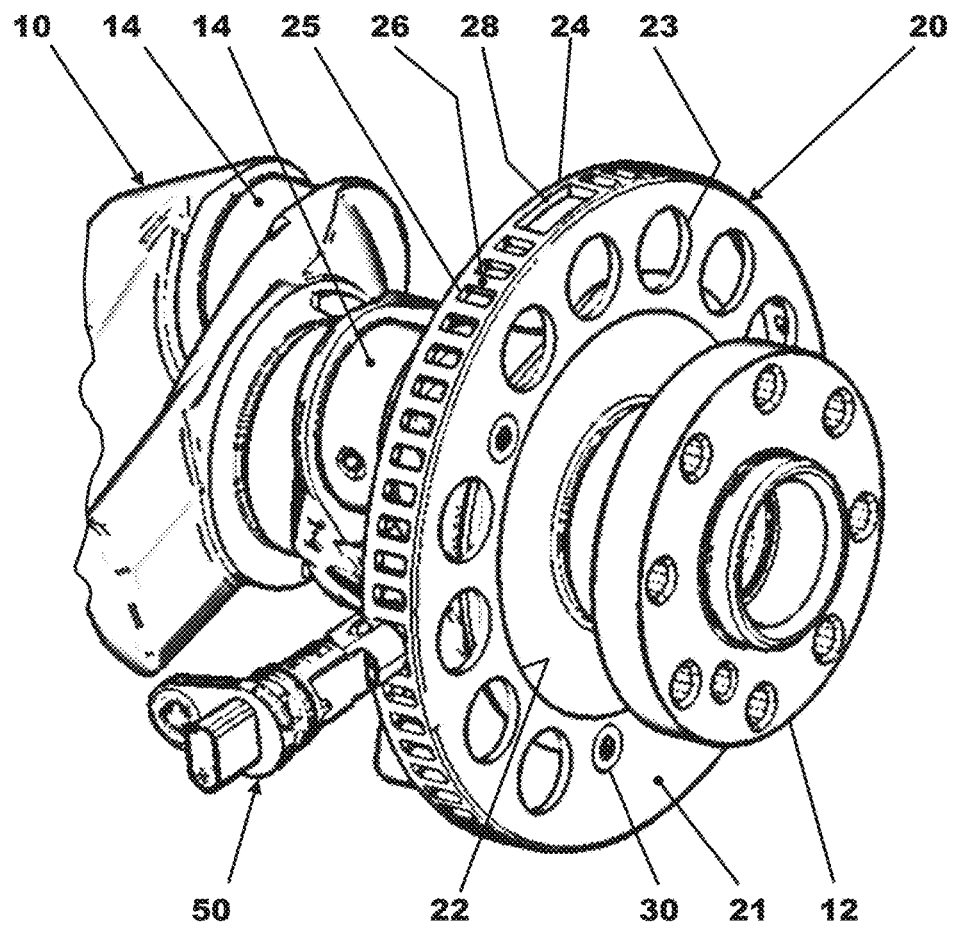
FIG. 5 is a reversed pictorial view of the trigger wheel shown in FIG. 4 showing the trigger wheel mounted on one end of a crankshaft of the engine and the location of an associated sensor.
Figure 9:
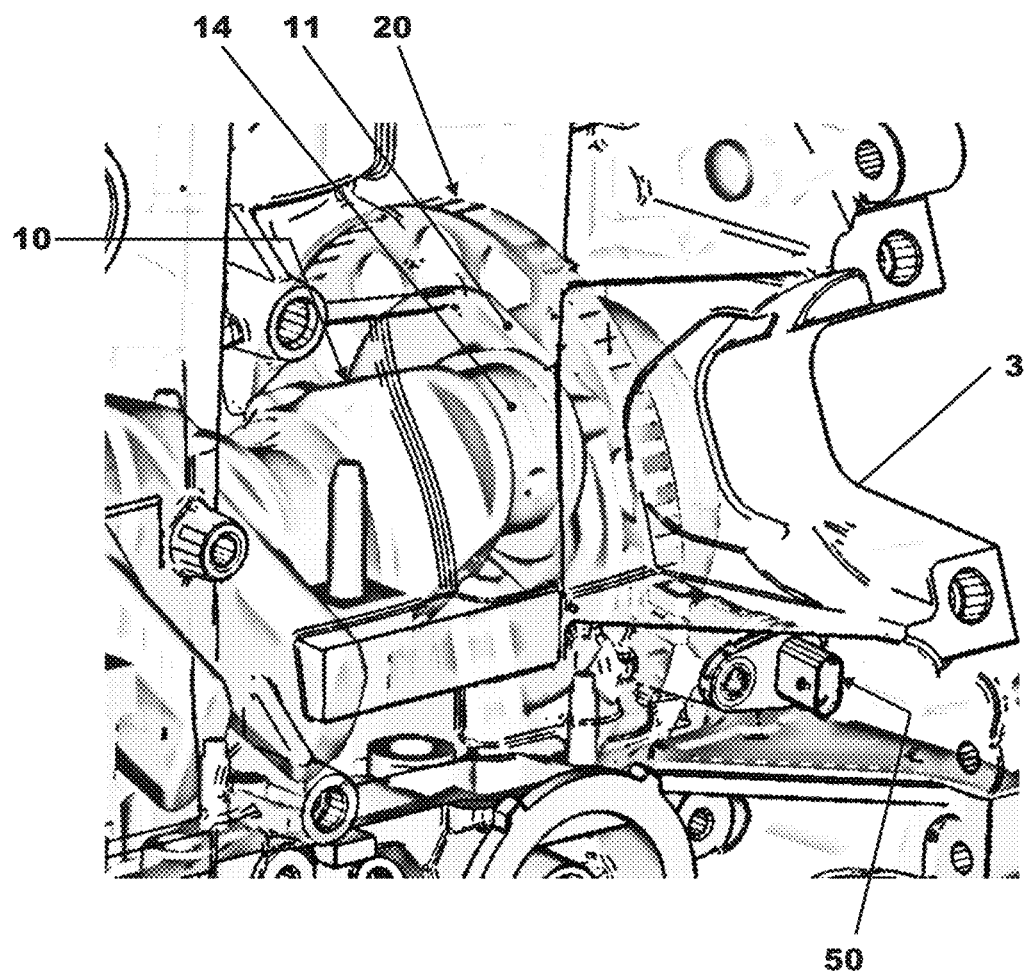
FIG. 9 is a transparent pictorial view of one end of the cylinder block of the engine showing the location of the trigger wheel and associated sensor.

As shown in FIGS. 5 and 9 a sensor 50 forming part of an engine control system is located in use in close proximity to the cylindrical rim portion 24 of the trigger wheel 20 so as to sense the passing of the trigger teeth 26.

Therefore in summary, a key feature of this invention is the combination of a bent over/cage trigger wheel design with stamped balance holes eliminating the requirement for 100% balancing of the component.

Such a trigger wheel can be assembled inside the engine with minimal sacrifice of available counterweight (wheel is thin, and maintains mass in the same angular position as the counterweight.

The use of a bent over wheel/cage design for the teeth allows the associated sensor to be positioned further forward in the cylinder block, without having to have a thicker trigger wheel. The bent over wheel/cage design forms a closed band that protects the teeth from damage.

Because very little material has to be removed from the counterweight, it allows for the counterweight to be sufficiently thick to drill balance holes on the production line, maintaining line speed and cheap production processes.

A thin trigger wheel also allows the component to be stamped.

A stamped trigger wheel is inexpensive to manufacture, and allows for accurate control of the part unbalance without 100% balance checking.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. An engine, comprising:
a cylinder block; and
a crankshaft rotationally supported by the cylinder block, the crankshaft including:
a flywheel flange at one end of the crankshaft, the flywheel flange arranged outside an end wall of the cylinder block;
an end counterweight arranged proximate to the flywheel flange and interior to the end wall, the end counterweight including a first portion that extends further outward in a radial direction, relative to a longitudinal axis of the crankshaft, than a second portion of the end counterweight; and
an engine trigger wheel stamped from a single piece of steel, comprising:
a central annular portion that is annular with an inner edge defined by a central aperture, the central aperture mounted on a circumferentially extending inner wall of a recess of the end counterweight; and
a cylindrical rim portion arranged around an outer periphery of the central annular portion, the cylindrical rim portion turned over and extending outward from the central annular portion in a direction of an axis of rotation of the trigger wheel and overlying an outer periphery of the end counterweight, where the cylindrical rim portion is spaced away from the outer periphery of the end counterweight, in a direction perpendicular to the axis of rotation of the trigger wheel, by a gap, the gap maintained around the circumference of the trigger wheel, the cylindrical rim portion having a plurality of circumferentially spaced apart trigger teeth and the central annular portion has a plurality of apertures formed therein to move a center of mass of the trigger wheel away from the axis of rotation of the trigger wheel, the plurality of apertures spaced apart from one another and asymmetrically positioned around a circumference of the central annular portion, on a side of the central annular portion that corresponds to the second portion of the end counterweight, wherein there are a number of circumferentially spaced, stamped apertures in the cylindrical rim portion and each of the trigger teeth is formed by a land between two adjacent apertures.

2. The engine as claimed in claim 1, wherein each trigger tooth extends substantially parallel to the axis of rotation of the trigger wheel, where a length of each trigger tooth, in the direction of the axis of rotation of the trigger wheel, is longer than a thickness of the central annular portion and wherein the thickness of the central annular portion is equal to a thickness of the cylindrical rim portion.

3. The engine as claimed in claim 1, wherein the central annular portion defines a number of circumferentially spaced fixing holes used to fasten the trigger wheel to a crankshaft of the engine.

4. The engine of claim 1, wherein the central annular portion has an outer peripheral edge aligned with an outer surface of the cylindrical rim portion and wherein the recess of the end counterweight is on a side of the end counterweight that faces the end wall of the cylinder block.

5. The engine of claim 4, wherein each trigger tooth extends inward, in the direction perpendicular to the axis of rotation of the trigger wheel, from the outer surface toward the axis of rotation of the trigger wheel.

6. The engine of claim 1, wherein each of the spaced, stamped apertures is stamped into the cylindrical rim portion from an outer surface of the cylindrical rim portion toward the axis of rotation of the trigger wheel, in a direction perpendicular to the axis of rotation of the trigger wheel.

7. The engine of claim 1, wherein the central annular portion includes a number of circumferentially spaced fixing holes used to fasten the trigger wheel to the crankshaft, the fixing holes separate from the plurality of apertures.

8. An engine having a crankshaft located within a cylinder block of the engine, the crankshaft having a number of counterweights to provide dynamic balancing of the crankshaft in use including an end counterweight located in close proximity to one end wall of the cylinder block, where an end of the crankshaft extending exterior to the end wall includes a flywheel flange, the end counterweight having a recess formed therein in which is mounted an engine trigger wheel, wherein the trigger wheel is angularly positioned and has an out-of-balance mass sufficient to compensate for an out-of-balance effect of material lost from the end counterweight due to the recess, and a cylindrical rim portion of the trigger wheel extends away from the one end wall of the cylinder block, away from the flywheel flange, in a direction parallel to an axis of rotation of the trigger wheel; wherein the trigger wheel is stamped from a single piece of steel comprising a central annular portion and the cylindrical rim portion which is turned over from the central annular portion, the cylindrical rim portion arranged around an outer periphery of the central annular portion and extending outward from the central annular portion in the direction parallel to the axis of rotation of the trigger wheel, the cylindrical rim portion overlying the end counterweight and spaced apart from the end counterweight, around an entire circumference of the trigger wheel, by a gap, and having a plurality of circumferentially spaced apart trigger teeth, and the central annular portion having a plurality of apertures formed therein to move a center of mass of the trigger wheel away from the axis of rotation of the trigger wheel, the plurality of apertures circumferentially spaced apart from one another around the central annular portion on a side of the central annular portion that is not aligned with a first portion of the end counterweight that extends farther outward, radially in a direction of an axis of rotation of the crankshaft, than a remaining portion of the end counterweight, and a central aperture that fits on a circumferentially extending inner wall of the recess of the end counterweight, wherein there are a number of circumferentially spaced, stamped apertures in the cylindrical rim portion and each of the trigger teeth is formed by a land between two adjacent apertures, and where the central annular portion includes a number of circumferentially spaced fixing holes used to fasten the trigger wheel to the crankshaft.

9. The engine as claimed in claim 8, wherein a sizing, spacing, and positioning of the plurality of apertures in the central annular portion of the trigger wheel is arranged to compensate for the material lost from the end counterweight due to the recess and wherein each of the trigger teeth extends substantially parallel to the axis of rotation of the trigger wheel, where a length of each of the trigger teeth, in the direction of the axis of rotation of the trigger wheel, is longer than a thickness of the central annular portion and wherein the thickness of the central annular portion is equal to a thickness of the cylindrical rim portion.

10. The engine as claimed in claim 8, wherein a depth of the recess in the end counterweight is substantially equal to a thickness of the central annular portion of the trigger wheel.

11. The engine as claimed in claim 8, wherein the central annular portion is annular with an inner edge defined by the central aperture and an outer peripheral edge aligned with an outer surface of the cylindrical rim portion.

12. The engine as claimed in claim 8, wherein the central aperture is sized to provide a push fit onto the inner wall of the recess.

13. A crankshaft for an engine, comprising:
a flywheel flange arranged at one end of the crankshaft, the flywheel flange arranged outside an end wall of a cylinder block in which the crankshaft is rotationally supported;
an asymmetrical end counterweight arranged proximate to the flywheel flange and interior to the end wall, the end counterweight including a first portion that extends further outward in a radial direction, relative to a longitudinal axis of the crankshaft, than a second portion of the end counterweight; and
a unitary engine trigger wheel, comprising:
 a central annular portion that is annular with an inner edge defined by a central aperture of the central annular portion, the central aperture centered on an axis of rotation of the trigger wheel, and an outer peripheral edge; and
 a cylindrical rim portion arranged around an outer periphery of the central annular portion and bent over from the central annular portion, the cylindrical rim portion having circumferentially spaced apart trigger teeth, the central annular portion including a plurality of apertures to move a center of mass of the trigger wheel away from the axis of rotation of the trigger wheel, the plurality of apertures arranged on a side of the central annular portion that is aligned with the second portion of the end counterweight and does not overlap the first portion of the end counterweight in a direction of the axis of rotation of the trigger wheel, each of the trigger teeth formed by a land between two adjacent apertures of a number of stamped apertures spaced apart in the cylindrical rim portion, where the cylindrical rim portion extends outward from the central annular portion, in the direction of the axis of rotation of the trigger wheel and where a length of each of the trigger teeth, in the direction of the axis of rotation of the trigger wheel, is longer than a thickness of the central annular portion, where a thickness of the cylindrical rim portion is equal to the thickness of the central annular portion, and where the outer peripheral edge of the central annular portion is aligned with an outer surface of the cylindrical rim portion, the outer surface of the cylindrical rim portion spaced away from, in a direction perpendicular to the axis of rotation of the trigger wheel, an outer circumferential edge of the end counterweight, via a gap that is maintained around an entirety of a circumference of each of the end counterweight and the trigger wheel, the gap arranged between the outer circumferential edge of the end counterweight and the outer surface of the cylindrical rim portion.

14. The crankshaft of the engine as claimed in claim 13, wherein the central annular portion includes a number of fixing holes adapted to fasten the trigger wheel to the crankshaft, the number of fixing holes spaced apart from one another around a circumference of the trigger wheel, where a diameter of the fixing holes is smaller than a diameter of the plurality of apertures.

15. The crankshaft of the engine as claimed in claim 13, wherein each of the trigger teeth extends inward, in the direction perpendicular to the axis of rotation of the trigger wheel, from the outer surface toward the axis of rotation of the trigger wheel.

16. The crankshaft of the engine as claimed in claim 13, wherein each of the plurality of apertures is stamped into the cylindrical rim portion from an outer surface of the cylindrical rim portion toward the axis of rotation of the trigger wheel, in the direction perpendicular to the axis of rotation of the trigger wheel.

* * * * *